United States Patent [19]

Saitoh et al.

[11] 3,991,161

[45] Nov. 9, 1976

[54] METHOD OF REMOVING NITROGEN OXIDES FROM A GAS AND FOR CONVERTING SAME TO AMMONIUM SULFATE

[75] Inventors: Shigeru Saitoh; Tetsuya Watanabe; Koji Konno; Tadashi Nakamura, all of Iwaki, Japan

[73] Assignee: Kureha Kagaku Kogyo Kabushiki Kaisha, Tokyo, Japan

[22] Filed: Jan. 21, 1975

[21] Appl. No.: 542,777

[30] Foreign Application Priority Data

Jan. 21, 1974 Japan.................................. 49-9158
May 10, 1974 Japan.............................. 49-51934
Dec. 4, 1974 Japan............................ 49-138969

[52] U.S. Cl................................ 423/235; 423/351; 423/545
[51] Int. Cl.$^2$......................................... C01B 21/00
[58] Field of Search........... 423/235, 351, 367, 243, 423/239, 242; 55/68

[56] References Cited
UNITED STATES PATENTS

| | | | |
|---|---|---|---|
| 1,609,872 | 12/1926 | Garner et al........................ | 423/235 |
| 3,635,657 | 1/1972 | Bressan et al....................... | 423/235 |

FOREIGN PATENTS OR APPLICATIONS

| | | | |
|---|---|---|---|
| 1,302,767 | 1962 | France................................. | 423/235 |
| 1,251,900 | 1967 | Germany............................ | 423/235 |

*Primary Examiner*—Oscar R. Vertiz
*Assistant Examiner*—Eugene T. Wheelock
*Attorney, Agent, or Firm*—Lane, Aitken, Dunner & Ziems

[57] ABSTRACT

A method of removing nitrogen oxides from a gas containing nitrogen oxides and converting same to ammonium sulfate, wherein the gas containing nitrogen oxide is brought into contact with an aqueous solution which contains at least a ferrous salt and a sulfurous acid alkali salt to absorb the nitrogen oxides in the solution in the form of imidodisulfonic acid alkali salts, and the imidodisulfonic acid alkali salt is converted into ammonium sulfate by hydrolysis at a temperature higher than 100° C after separation and recovery of the salt from solution.

22 Claims, No Drawings

METHOD OF REMOVING NITROGEN OXIDES FROM A GAS AND FOR CONVERTING SAME TO AMMONIUM SULFATE

FIELD OF THE INVENTION

This invention relates to a method for removing nitrogen oxides from a gas containing nitrogen oxides, and more particularly to a method of removing nitrogen oxides from the gas and converting the nitrogen oxides to ammonium sulfate (($NH_4$)$_2SO_4$).

BACKGROUND OF THE INVENTION:

Examples of gases containing oxides of nitrogen (hereinafter referred to as $NO_x$) and exhaust gases from combustion apparatuses such as boilers, nitric acid manufacturing plant, various metal treating processes and other nitrogen oxide generating plants.

In recent years, concern has grown over the so-called photo-chemical smog. One of the main causes of such photochemical smog is a large quantity of $NO_x$ present in the atmosphere. It is therefore desirable to reduce the quantity of $NO_x$ contained in such exhaust gases and/or to remove $NO_x$ from such exhaust gases.

In combustion apparatuses such as boilers, for example, the $NO_x$ content in the exhaust gas has been reduced conventionally by employment of burners and furnaces of improved design. These methods, however, are not very effective because they allow the reduction of $NO_x$ only within narrow limits both for theoretical and economical reasons.

It is also well known in the art to employ the so-called wet type processes for the removal of $NO_x$ from an exhaust gas, using an alkaline aqueous solution containing sodium hydroxide or sodium sulfite; an aqueous solution of potassium permanganate; an aqueous solution of hypochlorite or chlorite; or an aqueous solution of ferrous salt and sulfurous acid alkali salt (alkali sulfite). The present inventors disclosed in their copending application Serial No. 517,370, filed October 23, 1974, as a new wet type process, a method for removing nitrogen oxides from a gas containing nitrogen oxides, which is characterized by bringing the nitrogen oxides-containing gas into contact with an aqueous solution containing an organic acid alkali salt and a salt of metal selected from the group consisting of Fe, Co, Ni, Cu and Mn in the presence of a sulfurous acid alkali salt. In the above-mentioned wet type processes, no method for effectively treating an absorption solution containing absorbed $NO_x$ has been devised. Accordingly, there is a strong demand for a method which is more efficient in removing $NO_x$ from a gas mixture by effectively treating the absorption solution.

SUMMARY OF THE INVENTION

It is therefore an object of the present invention to provide a method of removing $NO_x$ efficiently from a gas containing $NO_x$ in a wet type process, by effectively treating absorbed solution containing absorbed $NO_x$ for the removal of the $NO_x$ in the form of ammonium sulfate which is valuable as a fertilizer.

It has now been discovered that gases are absorbed in a solution containing a ferrous salt and a sulfurous acid alkali salt in the form of imidodisulfonic acid alkali salts. The present inventors have further discovered that the imidodisulfonic acid alkali salt can be converted into ammonium sulfate by hydrolysis at a temperature higher than 100° C in an acidic medium after separation and recovery of the salt from the absorption solution.

In the present invention a nitrogen oxides-containing gas is brought into contact with an aqueous solution which contains at least a ferrous salt and a sulfurous acid alkali salt to have to absorb the $NO_x$ in the solution in the form of imidodisulfonic acid alkali salt, and the imidodisulfonic acid alkali salt is hydrolyzed into ammonium sulfate at a temperature higher than 100° C after separation and recovery of the salt from the solution.

The above and other objects, features and advantages of the invention will become clear from the following description and the claims.

DETAILED DESCRIPTION OF THE INVENTION

The aqueous solution referred to herein as containing at least a ferrous salt and a sulfurous acid alkali salt is, for example, (1) an aqueous solution which contains a ferrous salt and a sulfurous acid alkali salt, (2) an aqueous solution which contains a ferrous salt, an organic acid alkali salt and a sulfurous acid alkali salt, (3) an aqueous solution which contains a ferrous salt, an organic acid alkali salt, an organic acid and a sulfurous acid alkali salt, (4) an aqueous solution which contains a ferrous salt of an organic acid and a sulfurous acid alkali salt, or (5) an aqueous solution which contains a ferrous salt of an organic acid, an organic acid alkali salt, an organic acid annd a sulfurous acid alkali salt. Examples of suitable ferrous salts include inorganic salts such as ferrous sulfate, ferrous nitrate and ferrous chloride, and various water-soluble ferrous salts of organic acids such as acetic acid, propionic acid, butyric acid, malonic acid, succinic acid, ethylenediamine tetracarboxylic acid and nitrilo-tricarboxylic acid and mixtures thereof. When an iron salt of ethylenediamine tetracarboxylic acid or nitrilo-tricarboxylic acid is used, the iron salt need not be in the form of ferrous salt but may also be used in the form of a ferric salt. The ferric salt is easily reduced to the corresponding ferrous salt by the coexisting sulfurous acid alkali salt, forming an aqueous solution which contains substantially a ferrous salt. The organic acid alkali salts used are water-soluble salts of organic acids, for example: salts of organic acids with alkali metals such as Li, Na and K; salts of organic acids with alkali earth metals such as Mg and Ca; and ammonium salts of organic acids. The organic acids forming these organic acid alkali salts include, for example: monobasic acids such as acetic acid, propionic acid and butyric acid; dibasic acids such as malonic acid and succinic acid; polybasic acids such as ethylenediamine tetracarboxylic acid and nitrilotricarboxylic acid. A typical example of a ethylenediamine tetracarboxylic acid is ethylenediamine tetraacetic acid (hereinafter referred to as EDTA) and a typical example of a nitrilotricarboxylic acid is nitrilo-triacetic acid (hereinafter referred to as NTA). The carboxylic acids forming ethylenediamine tetracarboxylic acids and nitrilo-tricarboxylic acids may be, for example, propionic acid, butyric acid or both of these acids. It should be understood, however, that the carboxylic acids are not limited only to these acids and that other suitable acids may also be employed. The sulfurous acid alkali salts are used in the form of $M_2SO_3$ or $MHSO_3$ (wherein, M represents an alkali as in the organic acid alkali salt) and include, for example, sodium sulfite, potassium sulfite, ammonium sulfite, sodium bisulfite, potassium bisulfite, ammonium bisulfite, mixtures thereof and the like.

It is assumed that, when an $NO_x$-containing gas is contacted with an aqueous solution which contains at least a ferrous salt and a sulfurous acid alkali salt as previously mentioned, the $NO_x$ and the ferrous salt form a complex in the aqueous solution and the complex thus produced forms an imidodisulfonic acid alkali salt by reaction with the sulfurous acid alkali salt, according to the following reaction formulae (1) and (2) (where the ferrous salt is represented by ferrous sulfate, $NO_x$ is represented by NO, and the sulfurous acid alkali salt is represented by sodium sulfite, respectively).

$$FeSO_4 + NO \rightarrow Fe(NO)SO_4 \qquad (1)$$

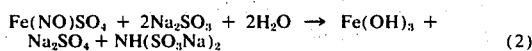

$$Fe(NO)SO_4 + 2Na_2SO_3 + 2H_2O \rightarrow Fe(OH)_3 + Na_2SO_4 + NH(SO_3Na)_2 \qquad (2)$$

It will be clear from the foregoing reaction formulae (1) and (2) that the absorption of $NO_x$ becomes difficult with an insufficient amount of ferrous salt and that it becomes difficult to satisfactorily produce the imidodisulfonic acid alkali salt with an insufficient amount of sulfurous acid alkali salt. Therefore, the aqueous solution should contain the ferrous salt and sulfurous acid alkali salt in adequate amounts. In the present invention, the aqueous solution should contain the ferrous salt in an amount, in terms of moles, equal to or greater than the amount of $NO_x$ to be absorbed, preferably in an amount at least 0.02% by weight. Moreover, the aqueous solution to be employed in the present invention should contain the sulfurous acid alkali salt in an amount, in terms of moles, two times greater than that of the ferrous salt, preferably in an amount at least 0.2% by weight. With large amounts of sulfurous acid alkali salt in the aqueous solution larger amounts of imidodisulfonic acid alkali salt are produced. When the content of the sulfurous acid alkali salt in the aqueous solution is equal to or greater than 1% by weight, approximately 90% of the $NO_x$ which has been absorbed in the solution is converted into imidodisulfonic acid alkali salt. In this manner, when the imidodisulfonic acid alkali salt is produced, a portion of the $NO_x$ which is absorbed in the aqueous solution forms a nitrilo-trisulfonic acid alkali salt ($N(SO_3M)_3$) and a sulfamic acid alkali salt ($NH_2SO_3M$). The thus formed nitrilo-trisulfonic acid alkali salt and sulfamic acid alkali salt are converted easily into ammonium salfate by hydrolysis when the imidodisulfonic acid alkali salt is hydrolyzed as will be described. Therefore, the production of such nitrilo-trisulfonic acid alkali salt and sulfamic acid alkali salt do not impose adverse effects in the present invention.

It usually takes a relatively long time for $NO_x$ in the gas to produce imidodisulfonic acid alkali salt after absorption in the aqueous solution. For example, where the $NO_x$ is absorbed in the aqueous solution at 55° C and the solution, is then left standing at that temperature, it usually takes 3 to 4 hours before a major portion of the absorbed $NO_x$ is converted into imidodisulfonic acid alkali salt. The reaction time is reduced at higher temperatures, for example, at 90° C, 90% of the absorbed $NO_x$ is converted into imidodisulfonic acid alkali salt in 30 minutes. Thus, it is desirable to heat the absorption solution for the purpose of shortening the reaction time.

The imidodisulfonic acid alkali salt thus formed in the absorption solution shows the least solubility when it is in the form of a potassium salt or calcium salt, allowing easy separation from the absorption solution. Therefore, where the aqueous solution to be used for the absorption of $NO_x$ contains a potassium salt as the sulfurous acid alkali salt, the imidodisulfonic acid alkali salt which forms in the absorption solution is easily precipitated in the form of potassium salt simply by condensing or cooling the absorption solution. On the other hand, where the sulfurous acid alkali salt is not a potassium salt, the imidodisulfonic acid alkali salt may also easily be precipitated in the form of a potassium salt or a calcium salt for separation purposes simply by adding a potassium compound or a calcium compound such as potassium sulfate, potassium chloride, potassium nitrate, calcium hydroxide, calcium carbonate, calcium oxide, calcium chloride or the like to the resultant solution and then concentrating or cooling the absorption solution. Where a potassium compound is added to the absorption solution for separating the imidodisulfonic acid alkali salt in the form of a potassium salt, it is preferable to employ potassium sulfate as the potassium compound because potassium sulfate has a relatively low solubility as compared with other potassium compounds and allows for easy recovery and cyclic reuse. Where a calcium compound is added to the absorption solution for separating the imidodisulfonic acid alkali salt in the form of a calcium salt, it is preferable to employ calcium hydroxide as the calcium compound because calcium hydroxide has a more suitable solubility as compared with other calcium compounds and allows easy conversion of the imidodisulfonic acid alkali salt to the corresponding calcium salt. Moreover, the use of potassium sulfate or calcium hydroxide avoids an accumulation of anions which occurs in the absorption solution when other potassium or calcium compounds such as potassium chloride, potassium nitrate or calcium chloride are used. The filtrate obtained after separating the imidodisulfonic acid alkali salt from the absorption solution in the form of potassium salt or calcium salt may be used again as the scrubbing solution for the absorption of $NO_x$. If the filtrate is recycled no problems arise even if a portion of the imidodisulfonic acid alkali salt remains in the filtrate. When the imidodisulfonic acid alkali salt is formed in the absorption solution, precipitation of a ferric salt ($Fe(OH)_3$) takes place in the absorption solution as shown by reaction formula (2) above. It is therefore necessary to remove the ferric salt by filtration from the absorption solution. Where the filtrate obtained after separating the imidodisulfonic acid alkali salt in the form of potassium salt or calcium salt is reused as a scrubbing solution for the absorption of $NO_x$, it is necessary to supplement the ferrous salt in the filtrate in an amount suitable for compensating the loss. However, this is not necessary when a polybasic acid such as EDTA or NTA is contained in the aqueous solution to be used for the absorption of $NO_x$, since the ferric salt which has been formed in the absorption solution in the form of a complex with the polybasic acid is easily reduced by the sulfurous acid alkali salt coexisting in the absorption solution, thus there is no need for the removal of the ferric salt or for the supplementation of the ferrous salt. Because a portion of the sulfite ions in the solution containing absorbed $NO_x$ (absorption solution) is consumed by the production of the imidodisulfonic acid alkali salt, it is necessary to supplement the sulfite ions in the filtrate which is obtained after separation of the imidodisulfonic acid alkali salt from the absorption solution in the form of a potassium or calcium salt, before recirculating the filtrate to the absorption step. However, where the gas under treatment contains sulfur oxides in addition to $NO_x$, the sulfur oxides are also absorbed in the absorption solution simultaneously with the $NO_x$ to produce sulfite ions in the absorption solution. In such a case, the addition of supplementary sulfite ions to the filtrate is not always necessary.

The imidodisulfonic acid alkali salt thus formed in the absorption solution is, after separation therefrom, hydrolyzed into ammonium sulfate under acidic conditions, preferably at a pH value of from 5.0 to 1.5, and at a temperature higher than 100° C. As shown by the reaction formulae (3) and (4) given below, it is assumed that the imidodisulfonic acid alkali salt is first converted into a sulfamic acid alkali salt (or sulfamic acid), which is then converted into ammonium sulfate by further hydrolysis.

$$2NH(SO_3M)_2 + 2H_2O \rightarrow 2NH_2SO_3M + M_2SO_4 + H_2SO_4 \quad (3)$$

$$2NH_2SO_3M + 2H_2O \rightarrow (NH_4)_2SO_4 + M_2SO_4 \quad (4)$$

(where M represents an alkali as previously mentioned).

The hydrolytic reaction of the imidodisulfonic acid alkali salt which has been formed in the absorption solution does not proceed substantially to the stage as shown by the reaction formula (4) at a temperature below 100° C and, as a result, a sulfamic acid alkali salt or sulfamic acid is produced in the solution. On the other hand, when the reaction temperature is higher than 370° C (which approaches the critical temperature of water), the reaction does not occur because water can not exist in the form of liquid at such temperatures. Therefore, in the present invention, it is necessary to maintain the hydrolytic temperature above 100° C, preferably within a range of from 110° to 200° C. In this instance, as previously mentioned, the absorption solution contains nitrilosulfonic acid alkali salt and sulfamic acid alkali salt, which are also converted into ammonium sulfate as shown by the following reaction formula (5) and the afore-mentioned reaction formulae (3) and (4).

$$2N(SO_3M)_3 + 2H_2O \rightarrow 2NH(SO_3M)_2 + M_2SO_4 + H_2SO_4 \quad (5)$$

(where M represents an alkali as previously mentioned).

The hydrolyzate-containing solution thus obtained (which contains ammonium sulfate) is acidic due to the production of sulfuric acid, which, however, may be neutralized with ammonia, thereby converting the sulfuric acid in the hydrolyzate-containing solution into ammonium sulfate as shown by the following reaction formula (6).

$$2H_2SO_4 + 4NH_3 \rightarrow 2(NH_4)_2SO_4 \quad (6)$$

Alternatively, the hydrolyzate-containing solution may be alkalized, for example, by the addition of sodium hydroxide, in order to release ammonia gas for recovery.

The thus obtained ammonium sulfate can be used to advantage, for example, as a fertilizer, after separation and recovery from solution. The filtrate as obtained after removal of the ammonium sulfate may be used again to form potassium imidodisulfonate or calcium imidodisulfonate. Where potassium sulfate is added to the solution containing absorbed $NO_x$ (absorption solution) to produce an acid potassium salt and the potassium imidodisulfonate is then hydrolyzed after separation from the solution, the hydrolyzate-containing solution will contain potassium sulfate which may be separated and recovered from the hydrolyzate-containing solution with the ammonium sulfate, so that it is possible to add the recovered potassium sulfate to the absorption solution. In view of this advantage, it is preferred in the present invention to add potassium sulfate to the absorption solution to form the imidodisulfonic acid potassium salt. In the formation of the potassium salt, the solution containing absorbed $NO_x$ should preferably be mixed with a suitable amount of potassium sulfate even where the scrubbing solution contains a potassium salt of sulfurous acid. Further, the ammonium sulfate and the potassium sulfate may be separated from the hydrolyzate-containing solution individually by precipitating them sequentially utilizing their different solubilities. Alternatively, the ammonium sulfate and the potassium sulfate may be precipitated together as a mixture and separated from each other after recovery from the hydrolyzate-containing solution.

It will be appreciated from the foregoing description that, according to the present invention, $NO_x$ which is contained in a gas mixture is efficiently removed in the form of useful ammonium sulfate.

The invention will be illustrated more particularly by the following examples, which are given only by way of example and therefore should not be construed as limitative of the invention.

EXAMPLE 1

| | |
|---|---|
| $FeSO_4$ | 2.0% by weight |
| $Na_2SO_3$ | 3.2% by weight |
| $CH_3COONa$ | 10.0% by weight |
| $CH_3COOH$ | 2.4% by weight |
| $H_2O$ | 82.4% by weight |

300 ml of NO gas was contacted at room temperature with 100 ml of an aqueous solution having the above composition absorbing therein 290 ml of the NO gas.

The liquid containing the absorbed gas was heated to 95° C and maintained at that temperature for 30 minutes. As a result, a precipitate of an iron compound appeared in the liquid, and a supernatant liquid was obtained by removing the precipitate. In order to separate $NH(SO_3Na)_2$ which was dissolved in the supernatant liquid, 10 g of KCl was added thereto, followed by cooling to room temperature, to obtain 4.5 g of a precipitate.

An infrared absorption spectrum analysis revealed that the precipitate separated from the supernatant liquid contained $NH(SO_3K)_2$. It was found by an analysis that the nitrogen content in the precipitate corresponded to 70% of the absorbed NO gas. A further infrared quantitative analysis revealed that the precipitate contained 47% by weight of $NH(SO_3K)_2$.

Thereafter, the filtrate which was obtained after the filtration of the precipitate from the supernatant liquid was heated and condensed to precipitate a mixture of $N(SO_3K)_3$ and $NH_2(SO_3K)$ which were found, as a result of a quantitative analysis, to have nitrogen contents corresponding to about 20% of absorbed No. As a result, it was confirmed that about 90% of absorbed NO gas was recovered and fixed.

EXAMPLE 2

| | |
|---|---|
| $FeSO_4$ | 2.0% by weight |
| $KHSO_3$ | 3.0% by weight |
| $CH_3COOK$ | 5.0% by weight |
| $CH_3COOH$ | 1.0% by weight |
| $H_2O$ | 89% by weight |

300 ml of NO gas was contacted at 55° C with 100 ml of an aqueous solution having the above composition absorbing therein 280 ml of the NO gas. The liquid containing the absorbed gas was left standing at that temperature for 180 minutes. As a result, a precipitate of an iron compound appeared in the liquid. 10 g of KCl was added to the separated supernatant liquid, followed by coolng, to obtain a second precipitate.

As a result of an infrared absorption spectrum analysis, it was revealed that the precipitate separated from the supernatant liquid contained $NH(SO_3K)_2$. The precipitate had a nitrogen content corresponding to about 70% of the absorbed NO gas.

EXAMPLE 3

| | |
|---|---|
| $FeSO_4$ | 2.0% by weight |
| $Na_2SO_3$ | 5.0% by weight |
| $CH_3COONa$ | 5.0% by weight |
| $CH_3COOH$ | 3.0% by weight |
| $H_2O$ | 85.0% by weight |

300 ml of NO gas was contacted at 60° C with 100 ml of an aqueous solution having the above composition, absorbing therein 290 ml of the NO gas. The liquid containing the absorbed gas was left standing at 60° C for 180 minutes. As a result, a precipitate of an iron compound appeared in the liquid. The iron compound was separated and 25 g of KCl was added to the supernatant liquid, followed by cooling, to obtain a second precipitate.

As a result of an infrared absorption spectrum analysis, it was revealed that the precipate from the supernatant liquid contained $NH(SO_3K)_2$ which had a nitrogen content corresponding to about 90% of the absorbed NO gas.

EXAMPLE 4

| | |
|---|---|
| $FeSO_4$ | 2.0% by weight |
| $Na_2SO_3$ | 2.0% by weight |
| $CH_3COONa$ | 10.0% by weight |
| $CH_3COOH$ | 2.4% by weight |
| EDTA-Na | 2.0% by weight |
| (ethylenediamine sodium tetraacetate) | |
| $H_2O$ | 81.6% by weight |

300 ml of NO gas was contacted at room temperature with 100 ml of an aqueous solution having the above composition, absorbing therein 280 ml of the NO gas. The liquid containing the absorbed gas was heated at 80° C for 1 hour and thereafter 8 g of $K_2SO_4$ was dissolved in the liquid, followed by cooling to room temperature, to obtain 3 g of a precipitate. An infrared spectrum absorption analysis and an elementary analysis revealed that the precipitate consisted of $NH(SO_3K)_2$ and $K_2SO_4$. According to a quantitative analysis by the infrared spectrum absorption method, the $NH(SO_3K)_2$ component in the precipitate contained approximately 50% of the nitrogen of the absorbed NO gas. After removal of the precipitate, the remaining liquid was mixed with $Na_2SO_3$ in a proportion of about 2%, followed by contact with 300 ml of NO gas in the same manner as previously described to absorb 270 ml of the NO gas. The liquid containing the absorbed gas was heated to 80° C and then mixed with 4 g of $K_2SO_4$, followed by cooling, to obtain a precipitate of approximately 2.6 g of $NH(SO_3K)_2$. The precipitate corresponded in nitrogen content to approximately 89% of the NO gas which was absorbed during the second contact absorption.

EXAMPLE 5

| | |
|---|---|
| $FeSO_4$ | 4% by weight |
| $Na_2SO_3$ | 4% by weight |
| NTA-Na | 4% by weight |
| (nitrilo sodium triacetate) | |
| $H_2O$ | 88% by weight |

300 ml of NO gas was contacted at 50° C with 100 ml of an aqueous solution having the above composition, absorbing therein 275 ml of the NO gas. The liquid containing the absorbed gas was left standing for 4 hours at 50° C and then 10 g of $CH_3COOK$ was dissolved in the liquid, followed by cooling to 10° C, to obtain 2.8 g of a precipitate. The precipitate, after centrifugal separation, was studied by infrared absorption spectrum analysis and found to contain $NH(SO_3K)_2$. Under a further quantitative analysis also employing the infrared absorption spectrum method, the 2.8 g of the precipitate was determined to contain 1.7 g of $NH(SO_3K)_2$, which corresponded to 58% of the absorbed NO gas. Presumably, the balance of the absorbed NO gas remained, as shown in Example 4, as dissolved $NH(SO_3K)_2$ in the scrubbing-liquid. It is thus possible to increase the recovery rate of imidodisulfonic acid alkali salt by repeated use of the scrubbing-liquid.

EXAMPLE 6

| | |
|---|---|
| EDTA-Fe chelate compound | 5% by weight |
| $Na_2SO_3$ | 4% by weight |
| $H_2O$ | 91% by weight |

Acetic acid was added to an aqueous solution having the above composition to adjust the pH value to 5.5. The thus prepared solution was placed in a gas absorption bottle. After heating the solution to 60° C, a nitrogen gas containing 300 ppm of NO was passed through the solution in the bottle at a rate of 100 l/h for 10 hours. The gas which was discharged from the bottle had an average NO content of 20 ppm. The liquid containing the absorbed gas was heated at 80° C for 4 hours, followed by addition of 4 g of $K_2SO_4$. Upon cooling the liquid, 1.4 g of $NH(SO_3K)_2$ precipitated. The precipitated $NH(SO_3K)_2$ corresponded in nitrogen content to 54% of the absorbed NO gas. In view of the fact that it was possible to precipitate more $NH(SO_3K)_2$ by further concentration of the liquid, the balance of the absorbed NO gas was presumably dissolved in the liquid in the form of $NH(SO_3K)_2$.

EXAMPLE 7

| | |
|---|---|
| $FeSO_4$ | 3.0% by weight |
| $CH_3COONa$ | 10.0% by weight |
| $CH_3COOH$ | 4.5% by weight |
| $Na_2SO_3$ | 5.0% by weight |
| $H_2O$ | 77.5% by weight |

8500 ml of NO gas was absorbed at 50° C in 2000 ml of an aqueous solution having the above composition. The solution was then heated at 80° C for 1 hour. As a result, a precipitate of iron hydroxide appeared in the solution. The precipitate was filtered out and 180 g of potassium sulfate was added to the filtrate, followed by cooling to 30° C, to precipitate crystals.

The crystals were in the form of a mixture consisting mainly of $NH(SO_3K)_2$ and $K_2SO_4$ and containing a small amount of sodium acetate and $NH_2SO_3K$. A quantitative analysis by the infrared absorption spectrum method revealed that the crystals contained 44.3 g of $NH(SO_3K)_2$. After filtering out the crystals, part of the filtrate was adjusted to a pH of 2.0 and then heated for 4 hours. Sodium nitrite was added thereto to generate nitrogen gas. As a result of calculation based on the amount of nitrogen gas generated from the filtrate, it was found that 33.4 g of $NH(SO_3K)_2$ still remained in the filtate as a whole. This brought the total amount of $NH(SO_3K)_2$ to 77.7 g, which corresponded in nitrogen content to 95.7% of the absorbed NO gas.

The above-mentioned crystals were washed with a small amount of cold water to obtain crystals which contained 42.1 g of $NH(SO_3K)_2$ and 6.8 g of $K_2SO_4$. The entire amount of the just-mentioned crystals, 0.1 g of concentrated sulfuric acid and 100 ml of water were put in an autoclave for reaction at 120° C for 8 hours with agitation. After the reaction, ammonia was added thereto little by little to adjust the pH value to 6.5, followed by cooling to 20° C, to obtain 25.9 g of $K_2SO_4$ crystals which were 92% in purity.

The just-mentioned $K_2SO_4$ crystals were separated by filtration and the filtrate was dried under reduced pressure to obtain 32.8 g of crystals which contained 2.1 g of $NH_2SO_3K$, 19.3 g of $(NH_4)_2SO_4$ and 8.6 g of $K_2SO_4$.

As a result, it was confirmed that $NH(SO_3K)_2$ had been hydrolyzed 100%, and $NH_2SO_3K$, the product of the hydrolysis, was further hydrolyzed 91%. Thus, $(NH_4)_2SO_4$ was produced from $NH(SO_3K)_2$ with a conversion of 96%. Thus, 91.7% of the absorbed NO gas was recovered in the form of $(NH_4)_2SO_4$.

EXAMLPLE 8

| | |
|---|---|
| $FeSO_4$ | 2.0% by weight |
| $Na_2SO_3$ | 3.2% by weight |
| $CH_3COONa$ | 10.0% by weight |
| $CH_3COOH$ | 2.4% by weight |
| $H_2O$ | 82.4% by weight |

300 ml of NO gas was contacted at room temperature with 100 ml of an aqueous solution having the above composition, absorbing therein 290 ml of the NO gas.

The resulting solution was heated at 95° C for 30 minutes to form therein a precipitate of an iron compound. After separating the precipitate from the liquid, $CaCO_3$ and $(CH_3COO)_2Ca$ were added to the resultant filtrate to adjust the pH to 6.2, and to convert the $Na_2SO_4$ and $Na_2SO_3$ into $CaSO_4$ and $CaSO_3$, respectively. This is because precipitates of $CaSO_4$ and $CaSO_3$ first form in the filtrate in converting the imidodisulfonic acid alkali salt into the form of calcium salt. Thereafter, $Ca(OH)_2$ was added little by little to the solution obtained by separating the thus precipitated $CaSO_4$ and $CaSO_3$ from the filtrate to adjust the pH to 8.0, followed by standing whereby 3.3 g of crystals precipitated.

The crystals were analyzed after recrystallization from water. The analysis revealed that the crystals had the chemical composition of $NS_2O_6NaCa.3H_2O$. Thus, 94% of the absorbed NO gas was recovered as $NS_2O_6NaCa.3H_2O$.

A liquid comprising 2.0g of $NS_2O_6NaCa.3H_2O$ and 100 ml of 0.1N $H_2SO_4$ was heated at a temperature of 160° C for 4 hours, followed by alkalinizing the liquid, to recover 158 ml of $NH_3$. Accordingly, 0.033 mol/l of $(NH_4)_2SO_4$ was contained in the hydrolyzate-containing solution.

What is claimed is:

1. A method for removing nitrogen oxides from a gas mixture and converting same to ammonium sulfate comprising:
   contacting the gas mixture with an aqueous scrubbing solution containing at least 0.02% by weight of at least a ferrous salt and at least 0.2% by weight of a calcium or potassium salt of sulfurous acid to absorb the nitrogen oxides, thereby forming a calcium or potassium salt of imidodisulfonic acid;
   separating said salt of imidodisulfonic acid from solution; then
   hydrolyzing said imidodisulfonic acid salt at a temperature above 100° C to form ammonium sulfate; and
   separating said ammonium sulfate from solution.

2. The method of claim 1 wherein said calcium or potassium salt of imidodisulfonic acid is hydrolyzed in an acidic aqueous solution at a temperature above 100° C followed by neutralization of said acidic aqueous solution by the addition of ammonia.

3. The method of claim 1 wherein said hydrolysis is conducted at a temperature in a range of from 110°–200° C.

4. The method of claim 1 wherein said hydrolysis is effected at a pH in the range of 5 to 1.5, inclusive.

5. The method of claim 1 wherein the solution remaining after the separation of said calcium or potassium salt of imidodisulfonic acid is recirculated for use as said scrubbing solution.

6. The method of claim 1 wherein said ferrous salt is selected from the group consisting of ferrous sulfate, ferrous nitrate, ferrous chloride, water soluble ferrous salts of organic acids, and mixtures thereof.

7. The method of claim 6 wherein said organic acid is an ethylenediamine tetracarboxylic acid or nitrilo tricarboxylic acid.

8. The method of claim 7 wherein said ethylenediamine tetracarboxylic acid is ethylenediamine tetraacetic acid.

9. The method of claim 7 wherein said nitrilo-tricarboxylic acid is nitrilo-triacetic acid.

10. The method of claim 1 wherein said scrubbing solution additionally contains an organic acid, an alkali salt of an organic acid, or a mixture thereof.

11. The method of claim 10 wherein said organic acid is selected from the group consisting of acetic acid, propionic acid, butyric acid, malonic acid, succinic acid, ethylenediamine tetraacetic acid and nitrilotriacetic acid.

12. The method of claim 1 wherein said alkali salt of sulfurous acid is selected from the group consisting of sodium sulfite, potassium sulfite, sodium bisulfite, ammonium sulfite, ammonium bisulfite, potassium bisulfite and mixtures thereof.

13. A method for removing nitrogen oxides from a gas mixture and converting same to ammonium sulfate comprising:
contacting the gas mixture with an aqueous scrubbing solution containing at least 0.02% by weight of at least a ferrous salt and at least 0.2% by weight of an alkali salt of sulfurous acid, said alkali selected from the group consisting of lithium, sodium, magnesium, and ammonia to absorb the nitrogen oxides, thereby forming an alkali salt of imidodisulfonic acid;
adding a calcium or potassium compound to the solution to convert the imidodisulfonic acid alkali salt to the corresponding potassium or calcium salt;
separating said calcium or potassium salt of imidodisulfonic acid from solution;
hydrolyzing said imidodisulfonic acid calcium or potassium salt at a temperature above 100° C to form ammonium sulfate; and
separating said ammonium sulfate from solution.

14. The method of claim 13 wherein said compound is selected from the group consisting of potassium sulfate, potassium chloride, potassium nitrate, calcium hydroxide, calcium carbonate, calcium oxide and calcium chloride.

15. The method of claim 13 wherein said compound is potassium sulfate.

16. The method of claim 13 wherein said compound is calcium hydroxide.

17. The method of claim 13 wherein said ferrous salt is selected from the group consisting of ferrous sulfate, ferrous nitrate, ferrous chloride, water soluble ferrous salts of organic acids, and mixtures thereof.

18. The method of claim 17 wherein said organic acid is an ethylenediamine tetracarboxylic acid or nitrilo tricarboxylic acid.

19. The method of claim 18 wherein said ethylenediamine tetracarboxylic acid is ethylenediamine tetraacetic acid.

20. The method of claim 18 wherein said nitrilotricarboxylic acid is nitrilo-triacetic acid.

21. The method of claim 13 wherein said scrubbing solution additionally contains an organic acid, an alkali salt of an organic acid, or a mixture thereof.

22. The method of claim 21 wherein said organic acid is selected from the group consisting of acetic acid, propionic acid, butyric acid, malonic acid, succinic acid, ethylenediamine tetraacetic acid, and nitrilo-triacetic acid.

* * * * *

UNITED STATES PATENT OFFICE
CERTIFICATE OF CORRECTION

Patent No. 3,991,161          Dated November 9, 1976

Inventor(s) Shigeru Saitoh et al

It is certified that error appears in the above-identified patent and that said Letters Patent are hereby corrected as shown below:

Column 1, line 15, "and" should read --are--;
          line 62, before "gases" insert --$NO_x$--.

Column 2, line 30, "annd" should read --and--;

Column 3, line 5, "A ferrous" should read --a ferrous--;

Column 7, line 6, "No" should read --NO--;

Column 8, line 62, "100 1/h" should read --100 ℓ/h--;

Column 10, line 22, "Alkalinizing" should read -- alkalizing --.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks